April 15, 1969     L. STEINER     3,438,660
MECHANICAL CLAMPING MEANS
Filed Oct. 23, 1964
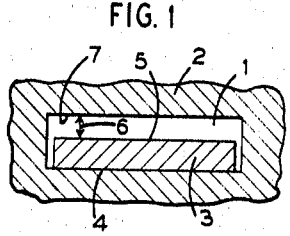
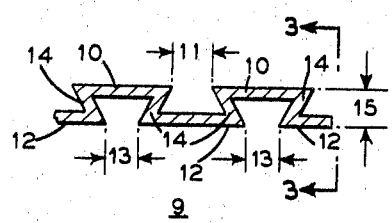
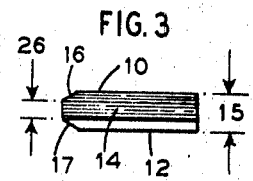
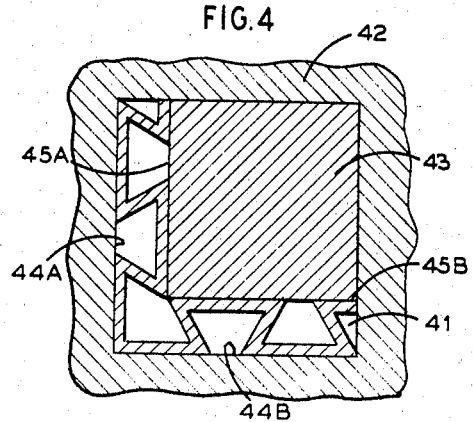
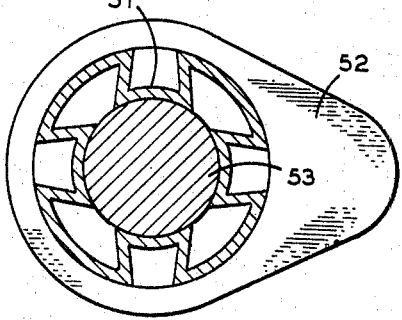
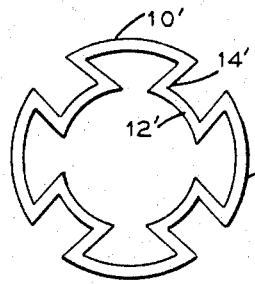
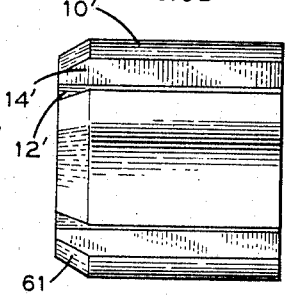
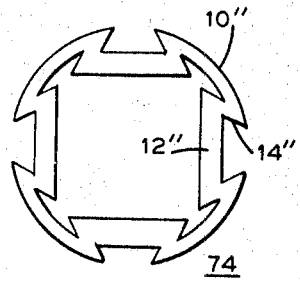
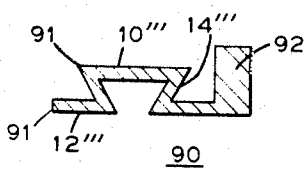
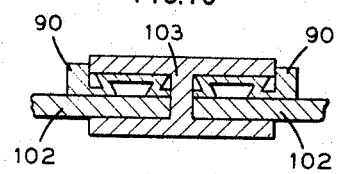
INVENTOR.
Lajos Steiner
BY
ATTORNEY United States Patent Office 3,438,660
Patented Apr. 15, 1969

3,438,660
MECHANICAL CLAMPING MEANS
Lajos Steiner, Neutral Bay, New South Wales, Australia, assignor of one-half to Robert F. Shaw, Locust Valley, N.Y.
Filed Oct. 23, 1964, Ser. No. 406,069
Int. Cl. F16d 1/06; B60b 27/06; F16c 3/10
U.S. Cl. 287—52.04         1 Claim

ABSTRACT OF THE DISCLOSURE

Frictional clamping means having a clamping insert which comprises a strip consisting of rows of bars connected and held apart by displacement bars. The insert is wedged between the opposed surfaces of two members which are to be clamped together. When wedged between the surfaces, the insert is stressed, causing the rows of bars to move closer together. The resulting strain energy stored in the displacement bars clamps the members with great force in fixed relative positions.

---

This invention relates to mechanical clamping means, and more particularly to devices for frictional clamping by insertion.

Frictional clamping by insertion may be employed in a large variety of applications, all of which have certain features in common. Specifically, this type of clamping is applicable to a configuration in which adjacent elements of the surfaces to be clamped are substantially parallel (although the surfaces as a whole need not be plane), and are so constrained that their separation is limited to an amount which will be referred to hereafter as the "spacing." Typical examples of such surfaces are two parallel planes or two coaxial cylinders. Relative motion of the surfaces in directions other than perpendicular to the surface elements is not necessarily constrained, and the constraint of such non-perpendicular motion is the function of the clamping insert.

A typical example of the clamping of coaxial cylinders is the clamping of a gear, pulley, cam, or similar object to a shaft. Many methods for such clamping are well known. A familiar method is the use of one or more setscrews, the usual arrangement being the use of two setscrews 90 degrees apart. Aside from the fact that setscrews are subject to loosening by vibration, they have the additional disadvantage that their points, whether cone or cup, tend to burr the shaft; this is not too serious in the case of a pulley, but in the case of a cam the burrs interfere with subsequent adjustments of angular position, particularly where the new setting is quite close to, but not identical to, a previous one.

Another type of fastener sometimes used for the purposes just described consists of a pair of tapered bushings driven between the shaft and the hub of the pulley or gear. While these have the advantage of distributing the forces on shaft and hub over a larger area and thus avoiding burring, and while they do not necessarily require any special machining of hub or shaft, the tapered construction is particularly susceptible to loosening by vibration, since once an axial displacement of the tapered member starts, the frictional force on shaft and hub decreases rapidly as the displacement increases.

Where fine adjustment of angular position is not required, but where loosening of setscrews by vibration is a problem, it is common practice to provide a flat (or two flats 90 degrees apart) on the shaft, permitting the setscrews (usually cup-point) to bear against a plane rather than a cylindrical surface. This requires, however, an extra machining operation. The same is true in the case of keying, where keyways must be provided in both shaft and hub.

Accordingly, the principal object of this invention is to provide an improved clamping insert.

A more specific object of this invention is to provide a simple and inexpensive means for clamping plane surfaces whose spacing is limited to a specified amount.

A further object is to provide a clamping device which can be quickly and easily inserted.

It is also an object of this invention to provide a clamping device which minimizes damage to the surfaces clamped.

A further object is to provide a clamping device which can be both manufactured and installed at low cost, and is thus applicable to large volume, mass-produced assemblies.

An important object of this invention is to provide a simple clamping device for securing gears, pulleys, and the like to a shaft.

Another object is to provide a device for clamping gears, pulleys, and the like to a shaft without the need for flats, keyways, or setscrews.

Another object is to provide a more satisfactory device for securing gears, pulleys, and the like to a shaft than the tapered bushings sometimes used, the latter being subject to loosening due to vibration.

An additional object of this invention is to provide an inexpensive, neat, and easily-installed fastener for wall panels and the like.

Brifly, in accordance with the preferred embodiment of the invention, a clamping insert is provided comprising a strip consisting of rows of bars connected and held apart by displacement bars which on insertion by force into a smaller space between two surfaces to be clamped is stressed, causing the rows of bars to get closer, and the resulting strain energy stored in said displacement bars clamps the articles with great force in position.

Other objects, features and advantages of the invention will be apparent from the following description and accompanying drawings, in which:

FIGURE 1 is a cross-sectional view of a typical configuration of elements requiring the clamping of plane surfaces;

FIGURE 2 is a cross-sectional view of a clamping insert, in accordance with an embodiment of the invention, adapted to the clamping of the surfaces of FIGURE 1;

FIGURE 3 is a side view taken along the lines 3—3 of FIGURE 2 showing the manner in which the clamping insert may be chamfered for easier insertion;

FIGURE 4 is a cross-sectional view of another embodiment of the invention which is used for clamping objects each of which has two plane parallel faces meeting at a specified angle;

FIGURE 5 is a cross-sectional view of still another embodiment of the invention for the clamping of a cam to its shaft;

FIGURES 6A and 6B are end and side elevational views of the clamping insert employed in the assembly of FIGURE 5;

FIGURE 7 is an elevational view of a portion of the clamping insert of FIGURES 6A and 6B with edges of clamping elements rounded to minimize damage to shaft or hub;

FIGURE 8 is an elevational view of another embodiment of the invention adapted to the clamping of an object of square cross-section in a hole of circular cross-section;

FIGURE 9 is a cross-sectional view of still another embodiment of the invention designed for the securing of wall panels in retaining channels; and FIGURE 10 is a cross-sectional view of a wall panel assembly using two of the clamping inserts of FIGURE 9.

Referring now to FIGURE 1, a situation will be seen which illustrates in one of its simplest forms an application for clamping by insertion. A rectangular slot 1 in a casting 2, of which only the part immediately surrounding the slot 1 is shown, is to receive a bar 3, the bar 3 being inserted in a direction perpendicular to the plane of the drawing. When the bar 3 rests against the lower surface 4 of the slot 1, its upper surface 5 is separated by the spacing 6 from the upper surface 7 of the slot 1, but is constrained by the lower surface 4 of the slot 1 from motion in such a direction as to increase the spacing 6. Thus a suitable clamping device, inserted between the surface 5 of the bar 3 and the surface 7 of the slot 1, will by frictional engagement of these two surfaces resist withdrawal of the bar 3.

FIGURE 2 shows an embodiment of the invention, clamping insert 9, suitable for clamping the configuration of FIGURE 1. Clamping insert 9 consists of a first plane array of parallel bars or clamping elements 10, of which two are shown, each bar being separated from adjacent bars in the array by a space 11 of which one is shown, such space being narrower than the bars themselves; a second plane array of similar parallel bars or clamping elements 12, of which three are shown, likewise separated by spaces 13, the widths of bars 10 being the same as those of bars 12, and the widths of spaces 11 being the same as those of spaces 13; and a series of separating bars 14 so arranged that they join the edges of bars 10 in the first array to the edges of bars 12 in the second array. Since the spaces 11 and 13 are less than the widths of the bars 10 and 12, each separating bar 14 lies in a plane which forms an acute angle with that of the bars 10 and 12 which it joins.

While, in the embodiment shown in FIGURE 2, the widths of the bars 10 and 12 are equal, and the spaces 11 and 13 are likewise equal, the same result will be achieved with other dimensional relations provided bar 12 is wider than space 11 and bar 10 is wider than space 13.

It should also be noted that, although FIGURE 2 shows two bars 10 and three bars 12, a configuration may be used (as discussed later in connection with the use of the invention for securing wall panels) in which there is only one bar 10 and two bars 12.

The clamping insert 9 of FIGURE 2 will under normal circumstances be formed in one piece by drawing or extension of any elastically deformable material, preferably metal, or synthetic plastic such as polyethylene, polypropylene or vinyl copolymers. Thus, although it is convenient in describing the invention to speak of the bars or clamping elements 10 and 12 in the two plane arrays, and the separating bars 14, as if all were separate elements, it will also be apparent from FIGURE 2 that actually they all form integral parts of one continuous array, and it is not necessary that the array have sharply-defined boundaries between the edges of the separating bars 14 and those of the bars 10 and 12.

In applying the clamping insert 9 of FIGURE 2 to the clamping of the configuration of FIGURE 1, it will be noted from FIGURE 2 that the upper surfaces of the bars 10 and the lower surfaces of the bars 12 lie in two parallel planes whose separation is the distance 15. In using clamping insert 9 for clamping the bar 3 into the slot 1 of FIGURE 1, the distance 15 of FIGURE 2 is chosen to be slightly greater than the spacing 6 of FIGURE 1. Thus in order to insert the clamping insert 9, the two plane arrays of bars 10 and 12 respectively must be brought closer together, stressing the elastically deformable separating bars 14. The result is to exert a force perpendicular to the surfaces 5 and 7 of FIGURE 1, such force being a function of the strain energy stored in the separating bars 14. Such strain energy depends on a variety of factors—the geometry of the array of FIGURE 2, the modulus of elasticity of the material, and the amount of compression (i.e., the ratio of the spacing 6 to the thickness 15 of the clamping insert 9). It should be noted that compression also results in the bars 10 and 12 in each parallel array moving closer together, the spacings 11 and 13 permitting this motion.

It is possible for the elastic limit to be exceeded in certain parts of the clamping insert 9 provided the characteristics of the material are such as to permit flow rather than breakage. In such a case the clamping insert 9 could probably not be removed from one assembly and reused in a different assembly in which the spacing 6 is greater, but assuming that the bars 14, or parts thereof, are still elastically deformed, the insert will hold in its original position even after being withdrawn and reinserted. Thus if some plastic deformation is permitted, the relation between the spacing 6 and the original insert thickness 15 need not be maintained to close tolerance.

Since the clamping insert 9 of FIGURE 2 must form an interference fit with the configuration to be clamped, it is desirable that one end of the clamping insert 9 be chamfered to facilitate insertion.

As shown in FIGURE 3, the thickness 26 is equal to or slightly less than the spacing 6. While FIGURE 3 shows both upper and lower edges 16 and 17 chamfered, in many applications it would only be necessary to chamfer one edge.

FIGURE 4 shows an embodiment of the invention for clamping a square or rectangular insert 43 in an opening 41 in a casting or similar body 42, in which clamping force is exerted on two adjacent faces 45A and 45B of the rectangular insert 43 and on the corresponding interior surfaces 44A and 44B of the opening 41 in the casting 42.

Referring to FIGURE 5, it may be seen how another embodiment of the present invention can be used for securing a cam to a shaft. FIGURE 5 shows the assembly with the clamping insert 51 in place, securing the cam 52 to the shaft 53. Clamping insert 51 is similar to clamping insert 9 and corresponding parts are shown with the same reference numerals but with prime designations added. FIGURES 6A and 6B show end and side views of the clamping insert 51 of FIGURE 5. The chamfer 61 is provided to facilitate assembly, as in the case of the flat fastener of FIGURE 3.

It will be noticed that no milling of flats or keyways is needed, it being only necessary to relate the shaft diameter and the inside diameter of the cam hub to the clamping insert 51 in such a way as to provide the necessary interference fit. By suitable choice of material and heat-treating for the clamping insert 51, as well as proper proportioning of the separating bars 14', the clamping insert can be made to accept a relatively wide range of compressions without stressing its separating bars 14' beyond their elastic limits, thus reducing the need for close tolerances in shaft diameter and inside diameter of cam hub. As previously noted, if some plastic deformation is permitted, even greater tolerances are possible.

Assembly will be facilitated if the clamping insert 51 is designed so its inside diameter provides a slip fit on the shaft 53, while its outside diameter is appreciably larger than the inside diameter of the hub of cam 52. Thus the clamping insert 51 can be slipped over the shaft 53, which may be fairly long, but when driven into the cam hub it will be compressed to grip the shaft 53.

Since the clamping insert 51 has clamping surfaces which are quite large in comparison to setscrews, and are more comparable to those obtained with tapered bushings, burring of the shaft is practically eliminated. Where burring must be held to an absolute minimum, the provision of a radius at edges 71, 72 (FIGURE 7) and other similar edges provide a simple safeguard.

It should be noted that the clamping insert 51 can easily be removed by driving it from the direction opposite to that used for insertion. Vibration, however, affects the clamping insert 51 much less than it affects tapered fasteners, since the torque transmitted by the clamping insert 51 from shaft 53 to cam 52 is, other things being equal, a function of the length of clamping insert 51 which is engaged (i.e., inserted between the hub of cam 52 and shaft 53). Thus a small axial displacement will cause only a correspondingly small decrease in torque transmission, whereas in the case of a tapered fastener a small axial displacement causes a large drop in torque transmission.

FIGURE 8 shows how another embodiment of the invention, clamping insert 74, which can be applied to the clamping of surfaces in which the spacing of individual respective elements of the surfaces to be clamped varies from point to point, provided some constraint on spacing of corresponding elements is still present. Clamping insert 74 is used to clamp a bar of square cross-section in a hole of circular cross-section. Clamping insert 74 is provided with four inner clamping elements 12″ and four outer clamping elements 10″, the inner elements 12″ having their interior surfaces flat rather than concave and each arranged at right angles to its adjacent surfaces, thus clamping the four faces of the bar. Like the clamping insert 51 of FIGURE 5, this one can be manufactured inexpensively by extrusion. Since the cost of drilling a hole of circular cross-section is appreciably less than that of broaching one of rectangular cross-section, a fastener such as that of FIGURE 8 may be expected to achieve substantial economies.

In FIGURE 9, still another embodiment of the invention is shown as clamping insert 90 (with corresponding parts designated by the same reference numbers but with triple prime designations added), designed for fastening sheets of material such as wall panels into retaining channels. Clamping insert 90 unlike those previously described, is designed for insertion in a direction at right angles to rather than parallel to the clamping elements, although still parallel to the clamping surface. For this reason the two edges 91 are chamfered to facilitate insertion, although of course the fastener could be compressed by means of a suitable tool to accomplish the same purpose. The rib 92 is provided primarily to provide a neatly finished appearance to the complete assembly, although it also serves to simplify removal of the clamping insert 90 if this should prove necessary.

In FIGURE 10, a typical assembly is shown using the clamping insert 90 of FIGURE 9. Here two of the clamping inserts 90 are used to secure wall panels 102 in a double retaining channel 103.

As used herein, the term "surface element" is not used in the mathematical sense of an infinitesimal area of the surface, but rather refers to one of two or more portions (for example, rectangular strips) into which the surface may be considered to be divided.

While only a few embodiments of the invention have been described and illustrated herein, it will be apparent to one skilled in the art that there are numerous other variations which embody its basic principles. Accordingly the invention is not intended to be limited to the particular embodiments set forth herein.

What is claimed is:
1. In an assembly comprising two substantially rigid coaxial elements, a clamping insert comprising at least two arcuate outer clamping elements in frictional engagement with the inner surface of the larger cylindrical element and an equal number of flat planar inner clamping elements in frictional engagement with the outer surface of the inner coaxial element, all clamping elements having edges parallel to the axis of the assembly; the width $w1$ of each outer clamping element being greater than the spacing $d$ between it and its adjacent outer element, $w1$ and $d$ being measured circumferentially along the inner surface of the larger coaxial element; each inner clamping element being so disposed that a radius through a point midway between its edges passes through a point midway between two outer clamping elements; the width $w2$ of each inner clamping element, measured circumferentially along the outer surface of the inner coaxial element, being at least equal to the distance $d$; and substantially planar straight elastically deformable separating elements connecting each edge of each inner clamping elements to the nearest respective edge of an outer clamping element and forming respective sharply defined acute angles therewith, each inner clamping element being thus connected to two adjacent outer clamping elements.

References Cited
UNITED STATES PATENTS

| | | | |
|---|---|---|---|
| 2,609,259 | 9/1952 | Wilkening et al. | 277—160 |
| 2,635,933 | 4/1953 | Engelhardt | 277—160 |
| 567,463 | 9/1896 | Frost. | |
| 624,315 | 5/1899 | Finin | 152—254 |
| 2,264,480 | 12/1941 | Owen | 287—2 |
| 2,393,349 | 1/1946 | Weingarten. | |
| 2,495,337 | 1/1950 | Lindham | 85—14 |
| 2,798,748 | 7/1957 | Maurer | 287—52.04 X |
| 2,879,117 | 3/1959 | Ellis | 267—1.5 |
| 2,931,412 | 4/1960 | Wing | 287—52 X |

FOREIGN PATENTS

| | | |
|---|---|---|
| 835,465 | 3/1952 | Germany. |

CARL W. TOMLIN, *Primary Examiner.*
ANDREW KUNDRAT, *Assistant Examiner.*

U.S. Cl. X.R.
287—126